Patented July 23, 1946

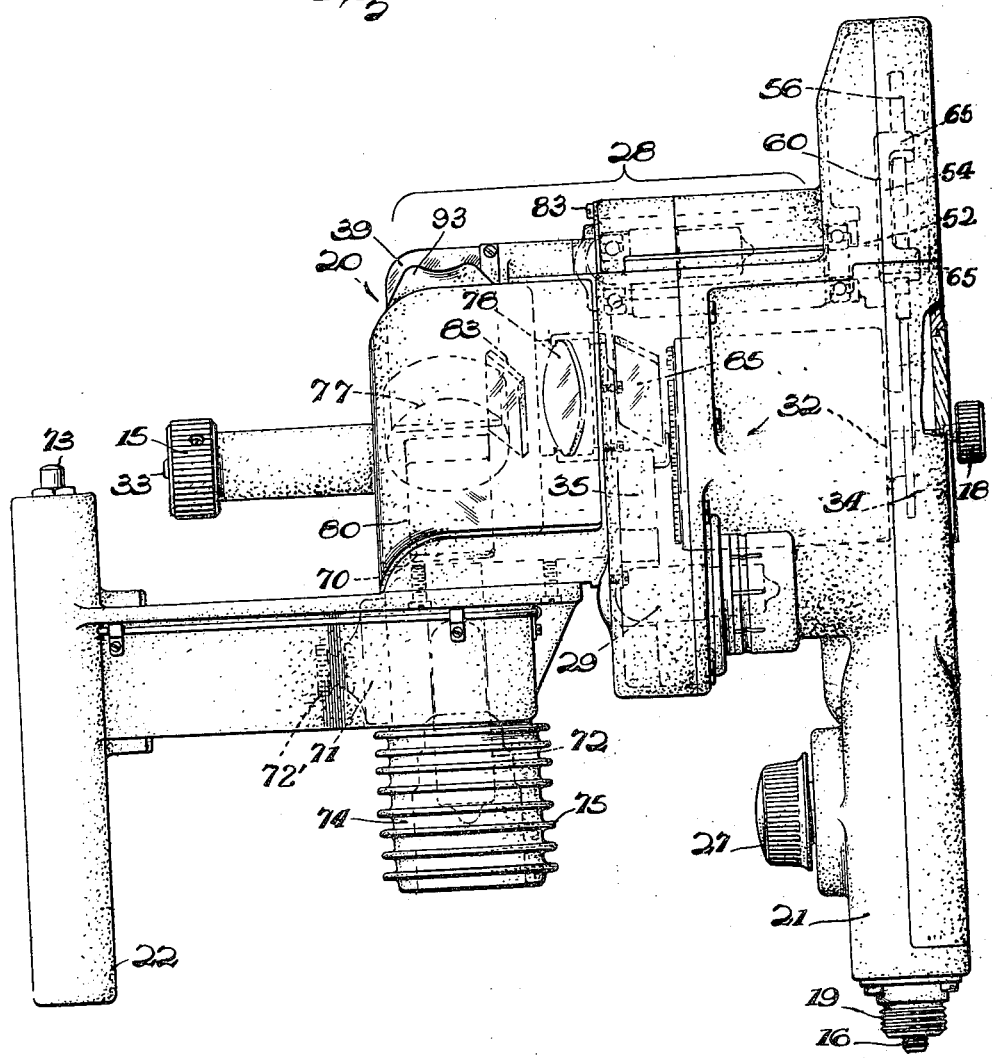

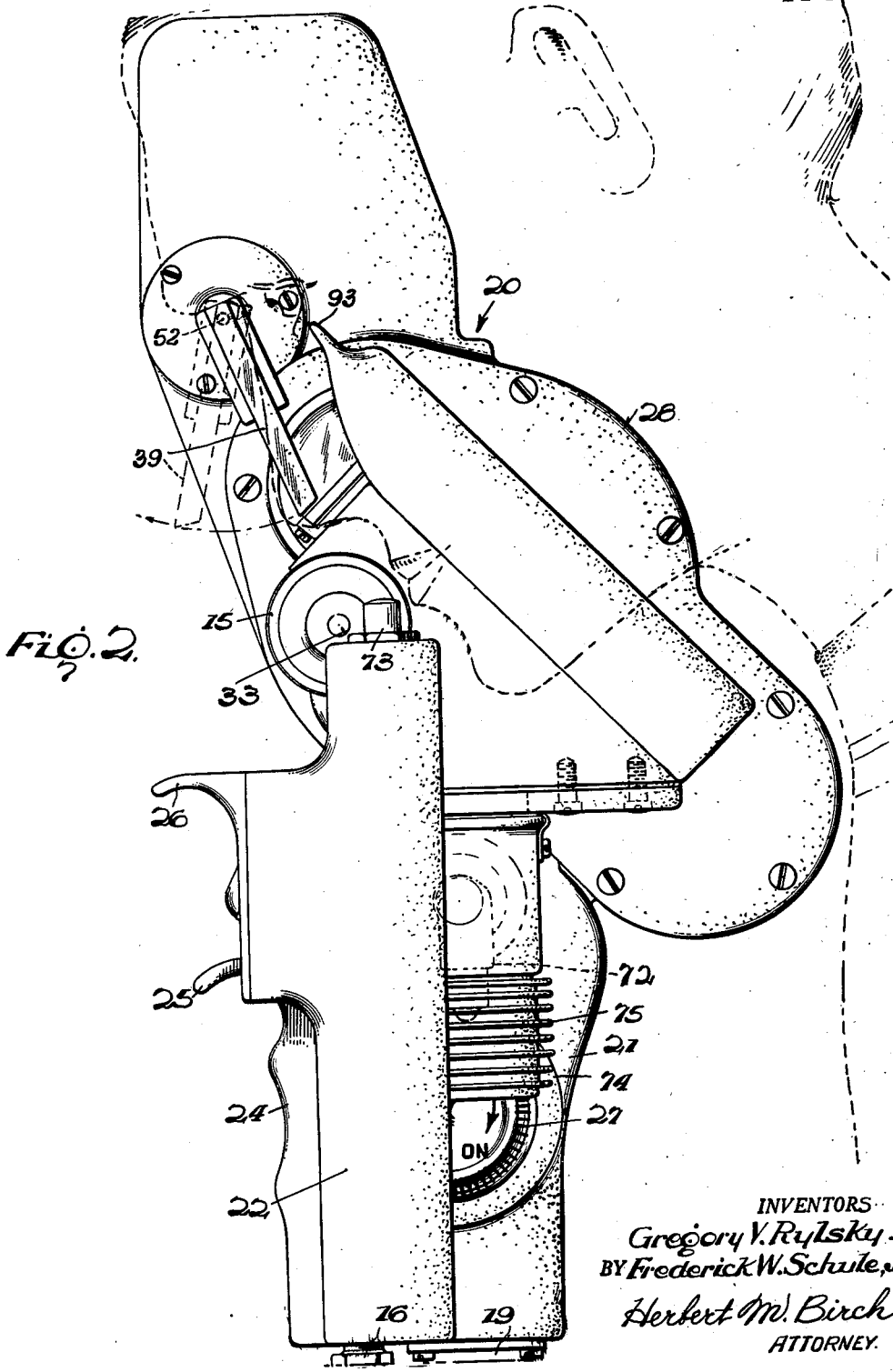

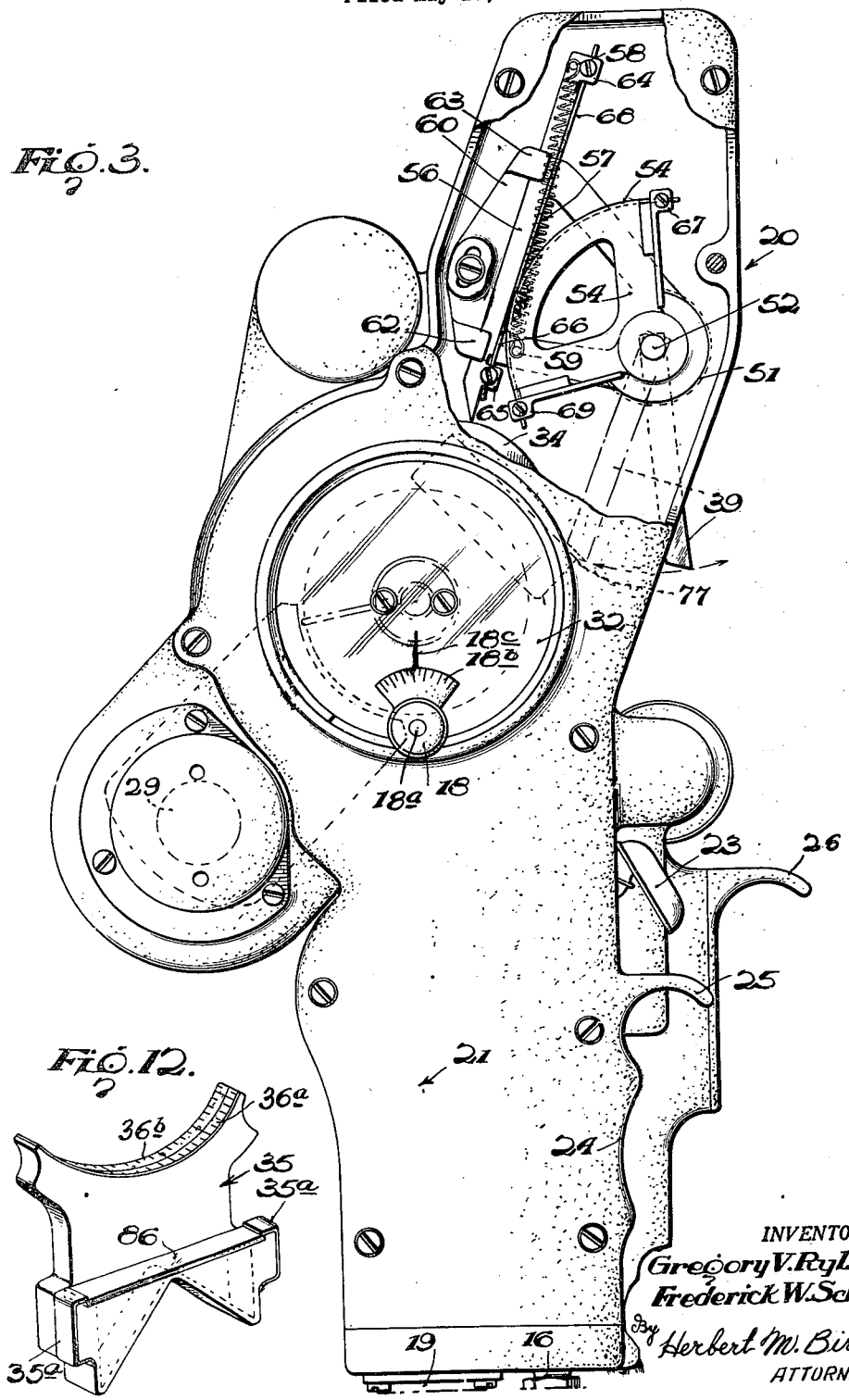

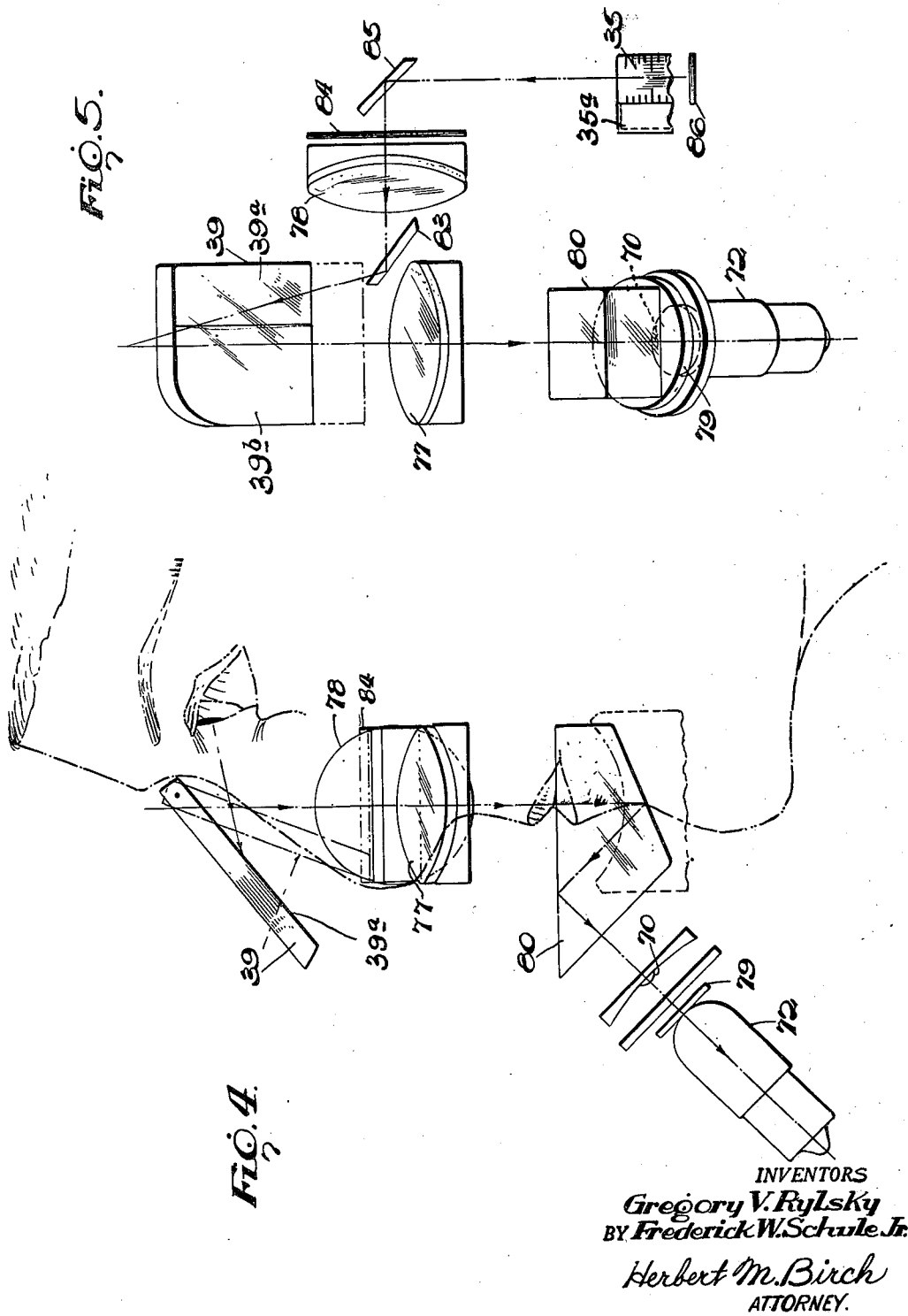

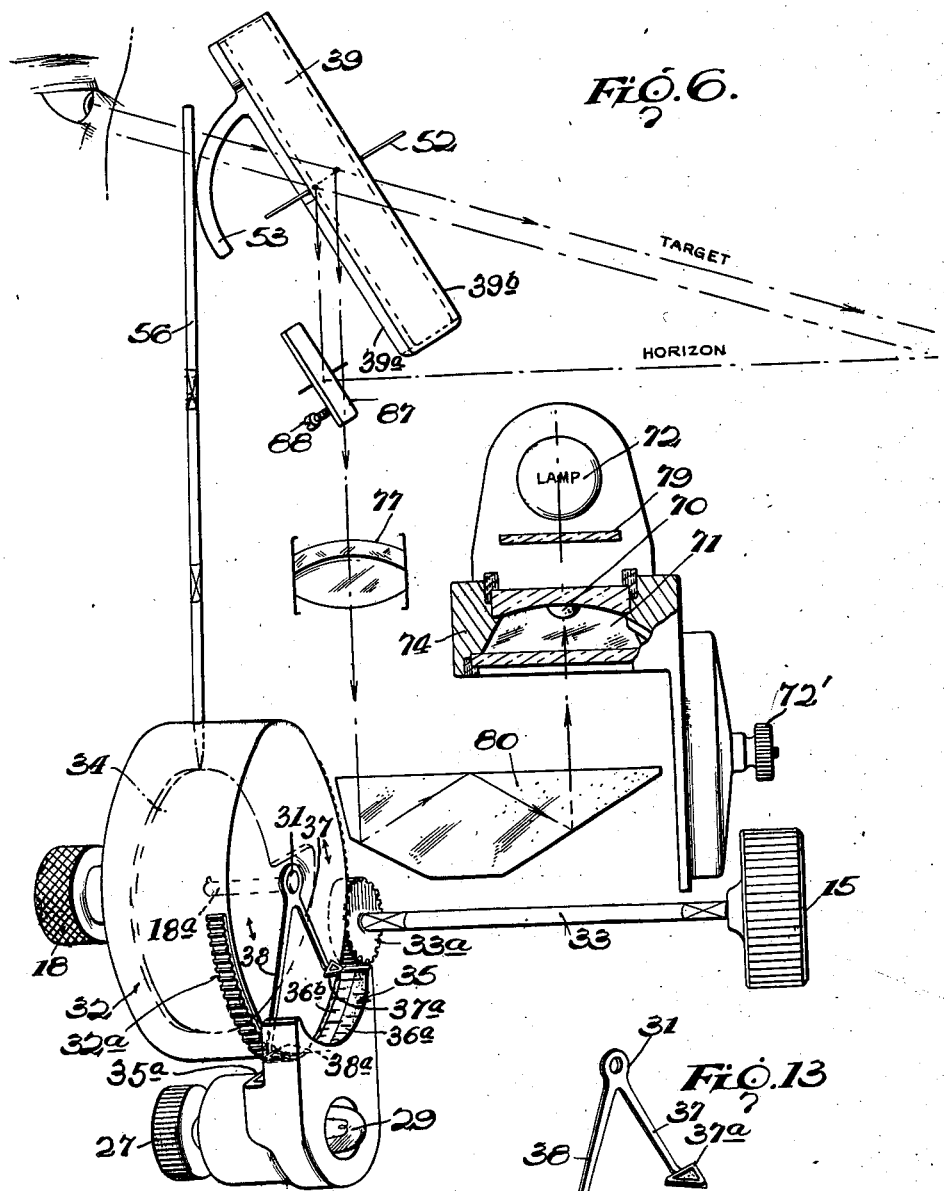

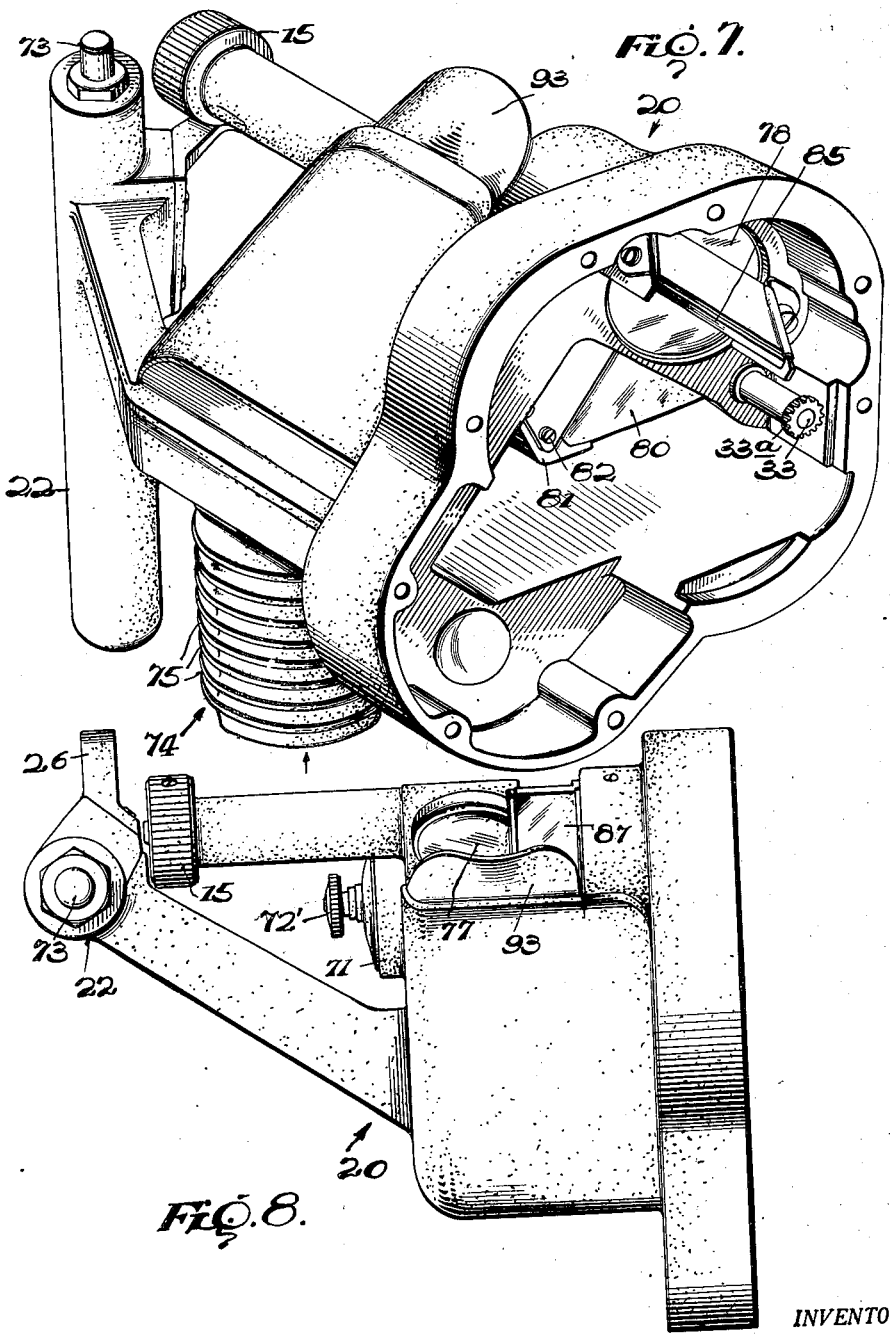

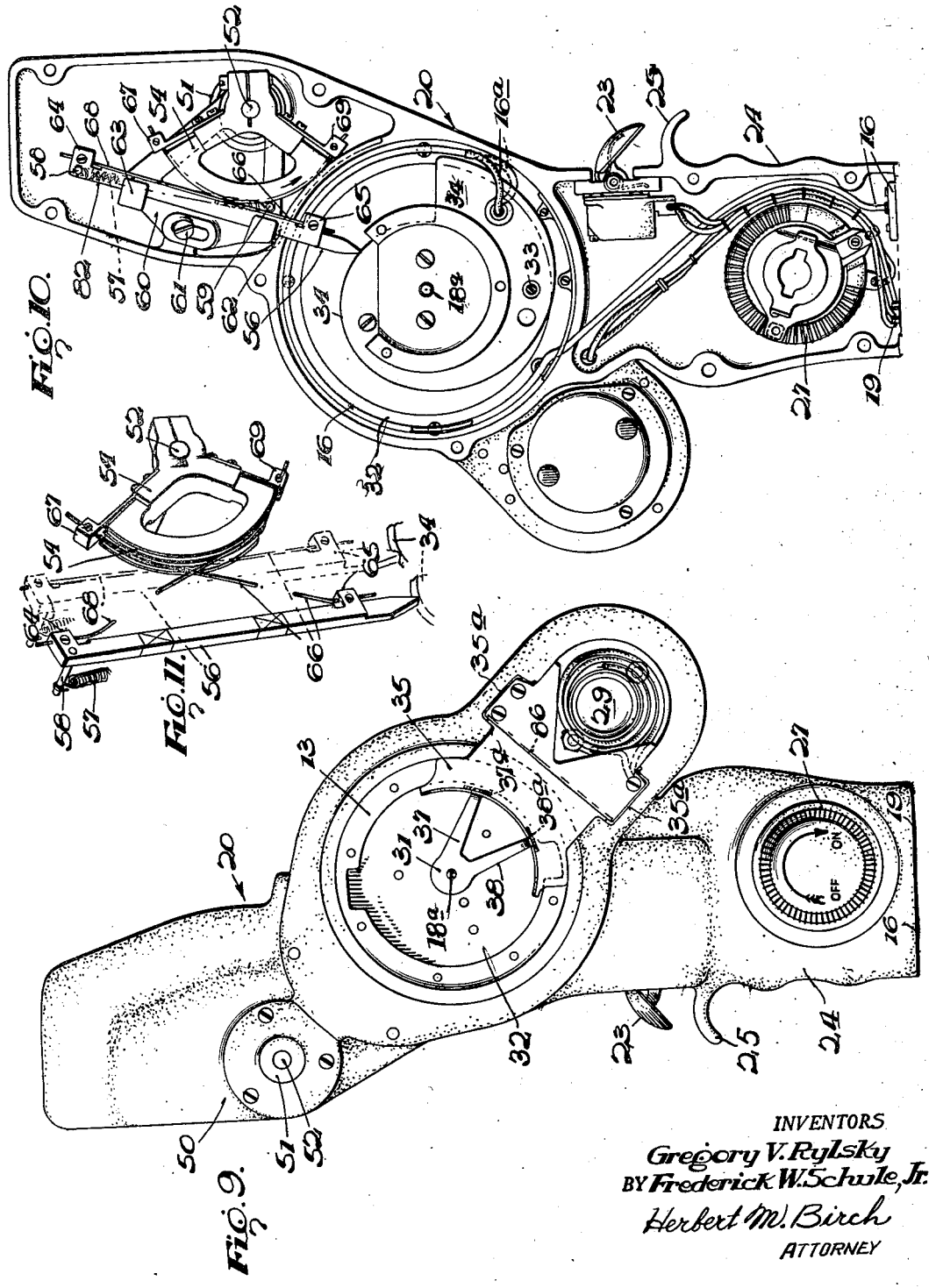

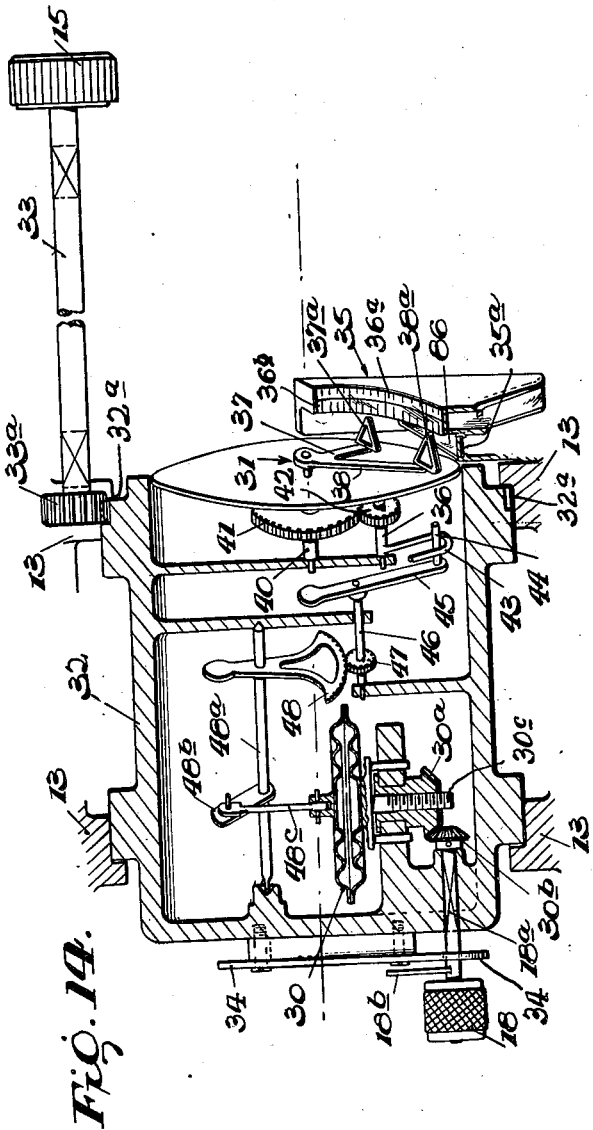

2,404,746

UNITED STATES PATENT OFFICE 2,404,746

HAND HELD LOW ALTITUDE BOMB SIGHT

Gregory V. Rylsky, Ridgefield Park, and Frederick W. Schule, Jr., Hackensack, N. J., assignors to Bendix Aviation Corporation, Bendix, N. J., a corporation of Delaware Application May 10, 1943, Serial No. 486,376

9 Claims. (Cl. 88—1)

The present invention relates to bombsights and more particularly to a low altitude impact-predicting bombsight adapted to semi-automatically correct angular position of an indicated impact-predicting spot for two independent variables, such as a known ground speed and an automatically introduced altitude.

A major problem of accurately directing bombs to strike visible targets from aircraft flying horizontally at relatively low altitudes above the targets is the proper timing of the bomb release. In solving this problem, heretofore, the mechanism devised has generally been complex with the result that severe restrictions are placed upon the pilot's choice of maneuvers as the target is approached; it being generally impossible to operate such prior complex devices with sufficient rapidity to correct for sudden last minute necessary maneuvers, such as may be essential to avoid anti-aircraft fire, last minute changes in direction of approach or in altitude above a target. Prior attempts to produce less restricting types—namely, impact-predicting bombsights resulted in less accurate and more inconvenient instruments.

Accordingly, an object of this invention is to provide an impact-predicting bombsight adapted to incorporate simplicity and to maintain an accurate indication of timing of release and to correct with greater rapidity, for changes in the above-mentioned independent variables, than heretofore.

Another object is to provide a portable bombsight adapted to be accurately sighted at any angular and linear displacement from the direction of flight so as to maintain simultaneous visibility of the target, the ground speed scale and the bubble image pending turn to a "collision course."

Still another object is to continuously indicate the point at which a bomb would strike if released at any moment during uniform horizontal flight in the direction of sighting.

Another object is to provide a semi-automatic logarithmic calculating device for low altitude bombing where value of trail is correctable or negligible and only ground speed is needed to be known to determine bomb dropping angles.

Another object is to provide in combination with an altitude-sensitive element of logarithmic output, an optical bubble system whereby the indicated logarithmic output image of the element and bubble are reflected at the same focus as the target being approached and angularly near thereto, so as to indicate an impact-predicting spot in relation to said target.

Another object is to provide an optical system having a variable-angle collimator mirror associated with bubble device, wherein the mirror angle is varied in accordance with the direct output of an altitude-sensitive calculator having a logarithmic ground speed scale, so positioned with respect to the variable-angle collimator mirror, that the logarithmic ground speed scale, the pointer, and the bubble are reflected in the mirror in such a way that their images appear on the "ground" ahead of the airplane in the line of sighting, angularly near a target in the line of sighting.

Yet another object is to provide in combination with an optical sighting system, an altitude-sensitive device adapted to simultaneously correct for two independent variables by the manual rotation of a single element.

And another object is to provide in combination with a novel indicator pointer, light polarizing means in an optical system, so arranged that substantially all light, in the optical field (or region) in which the pointer moves, will be intercepted except the colored images of the pointer, which are rendered plainly visible by means of a suitable thickness of material such as, Cellophane, to rotate the plane of polarization of the light to give substantially complete transmission of light through the colored pointer.

The foregoing and other objects and advantages of the present invention will appear more fully hereinafter from the following detailed description, when considered together with the accompanying drawings, wherein the parts in the specification are numbered and referred to by like numerals throughout the drawings.

It is to be expressly understood that the drawings, herewith, are for the purposes of illustration only and are not to be construed as defining the limits of the invention, reference being had for this purpose to the appended claims.

In the drawings:

Figure 1 is a front view in elevation.

Figure 2 is a left side view in elevation with the device illustrated in sighting position with respect to the bombardier's face.

Figure 3 is a right side view in elevation with the casing partly broken away.

Figure 4 is a side diagrammatic view of the optical elements and their respective positions with respect to the user's face.

Figure 5 is a front diagrammatic view of the optical elements illustrated in Figure 4.

Figure 6 is a diagrammatic view showing part of the elements in perspective of a modified form of the invention.

Figure 7 is a rear perspective view of the part or section of the sight casing that houses the optical elements disclosed diagrammatically in Figures 4 and 5.

Figure 8 is a top view of the part or section shown in Figure 7.

Figure 9 is a side elevation of the other section of the casing.

Figure 10 is a side elevation of the other side of the section shown in Figure 9 with part of the casing of said section removed to expose the operating mechanism thereof.

Figure 11 is a perspective view of the mirror operating elements, pulled apart to illustrate their specific drive association.

Figure 12 is a perspective view of the novel logarithmic scale as it appears unattached.

Figure 13 is a perspective view of the novel indicator pointer structure.

Figure 14 is a longitudinal section view of the altimeter casing with an installed perspective view of the pointer operating linkage interconnecting the altitude sensitive member to the double pointer adjacent the scale, and Figure 15 is a plan view of a double logarithmic scale employed in connection with the device.

Referring to the drawings in detail and particularly to Figure 1, the device includes a casing 20 so shaped and so proportioned as to house and support the essential elements to be hereinafter described. Casing 20 has two hand grips 21 and 22. Grip 21 provided for a right hand operation contains any suitable trigger type electric bomb release switch 23 (see Figure 3) suitably connected by a four-way contact plug 19 to the instrument light circuit, a source of power and the bomb release mechanism, not shown, through switch 23, and has a finger rest portion 24 and a finger guard 25. Adjacent to plug 19 is a Pitot static connection 16 that leads into an altimeter casing 32 from a flexible coupling 16a see Figure 10, projecting through an aperture in a cam 34. Grip 22 is disposed opposite the left hand of the bombardier parallel to grip 21 and if desired may have a finger guard 26.

The grip 21 is relatively larger than grip 22 and also houses a rheostat control switch 27 of any desired type in circuit with a light bulb 29.

Casing 20 has an enlarged transversely extending separable section 28 between grips 21 and 22.

Part of section 28 is associated with hand grip 21 and is formed with a rearwardly projecting housing enclosing the light bulb 29 (Figure 9), the illumination intensity of which is controlled by the rheostat 27. Fixed within said section and extending part way into the housing for lamp 29, is a ground speed scale member 35 made of a light conducting medium. The light of lamp 29 will be transmitted upwardly through the scale member 35. (Figures 3, 9 and 12.)

The upper edge of ground speed scale member 35 is a curved section, laid off in two logarithmic proportioned scales 36a and 36b, the indices of both scales representing ground speed. Scale 36a, for example, is laid off in speeds from 10 miles/hr. to 40 miles/hr., while scale 36b is laid off in speeds from 32 miles/hr. to 130 miles/hr. (Figure 15).

For the purpose hereinafter appearing, scale member 35 is further provided with an offset portion 35a adjacent to, but below the scales 36a and 36b. Portion 35a is clear and preferably polished to eliminate any refracting surfaces due to scratches in the surface.

Section 28 is further provided with a rotatable annular casing 32 supported in bearing members 13. Fixed to the outer surface of casing 32 is a cam 34, the form of said cam being shown in Figures 6 and 10. Rotatably mounted on the opposite surface of casing 32 is a double pointer 31, the construction of which and its purpose being hereinafter described.

Fixed within casing 32 and adapted to rotate therewith is an altitude sensitive member or aneroid 30. Atmospheric pressure is led into casing 32 by way of the pitot-static connection previously described. The expansion and contraction of aneroid 30, due to altitude changes, will rotate the double pointer 31 with respect to casing 32, as will hereinafter appear.

Casing 32 is further provided with a setting knob 18 secured to a shaft 18a which passes through the cam 34 and through the casing. The inward end of shaft 18a is provided with a bevel gear 30b which meshes with a second bevel gear 30a threaded on post 30c (Figure 14). Rotation of knob 18 will cause post and diaphragm to move axially in casing 32. The setting of knob 18 will move scale 18b fixed to shaft 18a with respect to a fixed index 18c (Figures 3 and 14).

Setting knob 18 is used for presetting the aneroid 30 with respect to the altitude of the target as represented by its barometric pressure. The scale 18b is preferably laid off in inches of mercury pressure (not shown). Thus, if the target is at sea level and barometric pressure is normal, knob 18 is turned until the index 18c reads "29.9." If the target selected is at the 500 foot level, the knob is turned until the index reads "29.3." The expansions or contractions, then, of the aneroid 30 due to atmospheric pressure within casing 32 will then be proportional to the actual height of the bombinb plane over the target. Thus the displacement of the diaphragm will be representative of bombing altitude.

The double pointer 31 is connected to a suitable linkage, so as to displace pointer 31 proportional to logarithm calibrations 36a and 36b to have a movement in relation to the altimeter case 32 and the cam 34 fixed to that case, which is proportional to one half of the logarithm of the altitude within certain altitude "zone" limits to the same angular scale as the ground speed scale; this will be further explained in detail under the heading "Theory and operation."

Briefly stated, cam 34 is so shaped or calibrated to drive or rotate a collimator viewplate (semitransparent member or transparent mirror) 39 of clear or semi-transparent glass from the vertical viewing position according to altitude and ground speed as corrected by the foregoing elements, for example according to the formula:

Mirror angle measured from the horizontal $= 45° + \frac{1}{2} \text{arccot antilog} (k + \log v_g - \frac{1}{2} \log p)$ where $p$ = altitude and $v_g$ = ground speed.

This formula is answered mechanically with the present device. The required transparent or semi-transparent glass mirror setting is entirely mechanical with the present device by the simple operation of rotating a control knob 15 which, by means of shaft 33 rotates a small gear 33a which meshes with and drives a large rack or gear 32a attached to or formed on the periphery of altimeter casing 32 and cam 34, until the angularly fixed points of the double altimeter pointer 31 indicates the true ground speed, on the two logarithmic scales 36a and 36b angularly displaced one with respect to the other and shown in fractions or tenths and whole units respectively for low and high speed ranges as well as to indicate increase or progressive change in altitude or barometric pressure in the same direction.

The double pointer 31, to proportionately cooperate with the logarithmic ground speed scale calibrations 36a and 36b, must be operated by a suitable linkage arrangement, associated with (or driven by) diaphragm 30 in altimeter casing 32, and is adapted to radially or rotatively swing or sweep the pointer arms 37 and 38 in a curve complementary to the calibrations or graduations 36a and 36b of the ground speed scale.

The linkage between the cell 30 and pointer 31, shown in Figure 14, includes a pointer spindle or shaft 40 to which pointer 31 is fixed, said spindle 40 projecting centrally from altimeter casing 32 and journalled therein, a gear 41 on the spindle or shaft 40 meshing with a spur gear or pinion 42 on a shaft 36, and an elongated loop 43 keyed or fixed to shaft 36 adapted to be traversed by an upstanding or outstanding pin 44 secured to a driven flat arm 45 and forming a crank arm to give a variable crank motion in connection with the movable loop 43 constituting a variable motion slotted arm on the shaft 36 to vary the rotation imparted to the latter.

Arm 45 is secured to a shaft 46 mounted for movement by a pinion 47 around the surface of a sector gear 48 suitably associated with aneroid or altitude sensitive cell 30, as by shaft 48a and links 48b and 48c. Thus, turning knob 18 will shift cell 30 and set barometric scale 18b at zero altitude or at any other desired point at target elevation and also pointer 31 through the medium of the linkage or operative connection between the knob 18 and thus the cell 30 and the pointer 31.

The movement of pin 44 within elongated loop 43 transmits a variable radial or rotative movement to the double pointer 31 in accordance with movements of arm 45 imparted thereto from the elastic cell or diaphragm movement by turning knob 18 or according to altitude. That is, as arm or bar 45 moves clockwise or counter-clockwise the operating radius between pin 44 and loop 43 is increased from the minimum radius position, so as to transmit an increasingly small number of degrees of radial sweep to pointer 31 with respect to scales 36a and 36b of scale piece 35.

The outer diameter of altimeter casing 32 around the lower diametrical or peripheral portion supports the ring gear or rack 32a. Ring gear 32a is in constant mesh with pinion gear 33a secured to shaft 33 adapted to be rotated by means of knob 15 to set for any known ground speed indication on scales 36a and 36b of scale piece 35 from an introduced altitude indication.

The logarithmic scale and scale piece 35 is made similar to a section of a circular slide rule scale, in that the numbers thereon are angularly spaced, rather than linearly spaced, proportional to their logarithms. To increase the range of the instrument with equal sensitivity and clarity of vision the scale on piece 35 is formed as if extended and "folded" into two parallel scales 36a and 36b preferably of different colors, as red and green, angularly calculated or spaced with respect to each other by an amount equal to the angle between the two angularly fixed arms 37 and 38 of the double pointer 31. Also, to correct for parallax error which otherwise would be present, the pointers attached to arms 37 and 38 are at the same radius (from the pointer spindle 40) as the ground speed scale.

The low range scale 36a is positioned farthest from the pointers since the linear error on the ground, which is due to inaccuracies in reading the scales, is proportional to the difference in numbers rather than to angular error on the scale, best shown in Figure 14. The high and low range logarithmic ground speed indications 36a and 36b that the low speed range pointer 38a intersects, are so arranged relative or with respect to the double pointer ends or arrow heads, that the low range scale is farthest from the ends of the double pointer.

Pointer 31 is made of the lightest weight material possible providing visibility and simplicity. It includes arms 37 and 38 disposed angularly with respect to each other, but parallel to the end of altimeter case 32. Triangular holes in the ends of arms 37 and 38 form pointers 37a and 38a which are bent to indicate at right angles, so as to extend to, but just short of the curved peripheral edge of logarithmic scale piece 35. The triangular pointers 37a and 38a of arms 37 and 38 are formed by punching through the material of the pointer 31 before bending. They are covered with webs of green and red material, such as Cellophane, each cooperating with the half of the scale, that is covered with corresponding colored strips of that material.

The offset portion 35a of scale member 35 below the logarithmic curved green and red colored portions, has clamped thereto a light polarizing screen strip 86 over which extends the green and red covered pointers 37a and 38a to the peripheral edge of scale piece 35. In cooperation with polarizing strip 86 below the pointers 37a and 38a is an additional light polarizing screen 84, shown in Figure 5, positioned so that light traversing lens 78 after passing through pointers 37a and 38a must first pass through this screen. The polarizing strip 86 and the polarizing screen 84 are so positioned in the optical system as shown in Figure 5, that the light from the lamp 29 passing through strip 86 is polarized in one direction, and in passing through screen 84 is polarized, again, at right angles to the polarization due to the strip 86. Due to the right angular polarization by the two polarizers, the light is completely absorbed. If a third member having bi-refringent characteristics is inserted between the first two members, and this third member rotated with respect to the two stationary members; a point will be reached when the light will be transmitted through all three members. The bi-refringent third member will rotate the plane of polarization to permit transmittal of light through all three members.

Certain materials, such as Cellophane, have a molecular structure which will change or rotate the plane of polarization, and are classed as bi-refringent material, in contradistinction to polarizing materials. The Cellophane webbing provided for the pointers 37a and 38a is so affixed that the plane of the polarized light transmitted by strip 86 is rotated. The pointers 37a and 38a will thus be visible against the otherwise black background of screen 84. The images of the pointers are then collimated by lens 78, and reflected by mirror 83 into the viewing plate 39.

It will be seen that the light from bulb 29 is, for the greater part, absorbed by the Cellophane covering of scale member 35, previously described, and by the polarizing screens provided. The reflected images of the pointers and the ground speed scales 36a and 36b as seen in the viewing plate are fairly dim so that their reflection will not interfere with the observation of the approaching target. The degree of illumination may be controlled by the rheostat 27. In use for day-bombing the intensity of illumination is considerably more due to the interfering daylight, than the intensity used during night-bombings. The purpose of projecting the scale and pointer images on the viewing plate is to permit the bombardier to observe the target approach while adjusting the ground speed scale. There is therefore no need to lower the present instrument to adjust and read a ground speed scale.

The collimator viewing plate 39 is provided with an eye shield 93 shown in Figures 7 and 8, and is secured to shaft 52 shown in Figure 3, along its upper peripheral edge and shaft 52 is journalled in a partition 50 by one of a pair of bearings 51. Shaft 52 extends from one bearing toward the outer wall of casing 20 and has a sector member 54 secured thereto.

Referring to Figures 9 and 10, the sector member 54 is adapted to be engaged by cam-operated rider arm 56 normally projected forward into engagement with the cam 34 by spring 57 secured to lug 58 on arm 56 and lug 59 on a bracket 60. Arm 56 is reciprocably mounted on bracket 60, mounted in the casing on bolt 61. The bracket 60 has apertured lugs 62 and 63 through which extends the arm 56, while the arm 56 has two projecting lugs 64 and 65 outside of each lug beyond the ends of sector 54. A tape 66 is secured to lug 65 at one end and to lug 67 of sector 54; and a tape 68 is secured at one end to lug 64 and to the lug 69 of sector 54 at the other end, so that rotation of cam 34 transmits reciprocating motion to arm 56 on grooved sector member 54 and through said movement and pull of the tapes 66 and 68 guided in the sector grooves transmits instant drive motion to said sector 54 to rotate shaft 52 and angle mirror or collimator viewing plate 39.

Collimator viewing plate 39 is a partially reflecting transparent or semi-transparent material; ordinary glass is suitable when the brightness of the target field is not great. Since the visibility requirements of the scale numerals on scale piece or plate 35 and pointer 31 are much greater than those for the bubble image, a completely reflecting front-surfaced or mirror portion of the viewplate is provided which may be on the right side of the clear glass viewplate, see Figure 5, for example, this being a reflecting strip 39a, and may extend between one quarter and one half of the total width of the plate 39. The remaining portion 39b may be either of gradually increasing density (ratio of reflected to transmitted light) from the low reflecting non-silvered portion to the completely reflecting strip, or of no intermediate densities.

Below the viewing plate 39 carried in the other part of section 28 associated with grip 22 is a novel optical system adapted to reflect and transmit the image of the logarithmic scales 36a and 36b of scale piece 35, double pointer 31 and an illuminated bubble 70 of a level or artificial horizon indicating device.

The bubble chamber 71 is illuminated by a bulb 72 connected to thumb operated button switch 73 in grip 22, see Figures 1 and 2. The bubble 70 to be viewed in plate 39 is caged within the bubble chamber or circular walled chamber 71 housed in casing 74 and adjusted by a knob 72′ having radially extending heat dissipating ribs or fins 75 around its outside surface, which is bolted to a wall of casing 20. Wall member 71 limits the movement of the bubble 70 and is visible in the optical field of the viewing plate 39, and accurate bombing will result even though the bubble is not held centered from the circular wall 71, as long as the bubble does not touch the wall. In an instrument such as described for low altitude bombing, about six degrees from the vertical is allowable.

Figures 4 and 5 show an arrangement of the optical elements, wherein two magnifying lenses 77 and 78 are used, instead of one lens 77, as illustrated in Figure 6. Lens 77 is of large aperture positioned so that the optical distances to the bubble 70 and the illuminated ground speed scales 36a and 36b are equal to the focal length of the lens.

By using two or more lenses the optical system can be made more compact, the angle of vision increased and the images magnified to any desirable degree to reduce aberrations.

The optical system of Figures 4 and 5 is illustrated in the casing 20, as one form of the device and includes a bubble chamber with a bubble 70, as shown in detail in Figure 6. A light bulb 72 positioned under the bubble cell illuminates bubble 70 by indirect lighting, a light stop or opaque disk 79 being provided for this purpose. This arrangement is necessary to prevent projection of the light bulb image.

Associated with the above described illuminated bubble cell is a prism 80 cut for the desired optical range of the instrument, as 45 degrees, and suitably mounted in a bracket 81 secured in casing 20 by bolts 82. Above and parallel to a plane of the prism is a magnifying lens 78 and positioned above lens 78 for cooperative angular adjustment proportional to cam 34 is index mirror, or collimator viewing plate 39 pivoted at 52 and moved by sector 54, tapes 66 and 68 and arm or pin 56 from cam 44.

Adjacent an upper side of lens 77 is a reflector 83 for adjacent lens 78 having its optical axis substantially parallel to that of lens 77 and angularly disposed with respect to the surface of reflector 83.

Behind lens 78 is a light polarizing means, as Polaroid screen 84 back of which is reflector 85 in series with the reflector 83. While below reflector 85 in the line of optical range is double logarithmic scale piece 35 and offset polarizing strip 86 over which are positioned colored pointer loops 37a and 38b for the purpose described supra.

Figure 6 is a modified form of the invention and differs from the form above described only in that one lens 77 is here used, to increase visibility and reduce aberrations. Also, a horizon mirror 87 with vernier adjustment 88 is included for calculations in clear weather when the natural horizon is clearly visible and for changing the base-line angle by a small amount to correct for trail, and the bubble chamber is positioned differently with respect to prism 80, which may be cut for 30 degree angles, or as required, to provide for proper optical range thereof with respect to the several elements referred to in Figures 4 and 5.

The hereinabove described scales and optical system provided therefor, are claimed in our co-pending application for Sighting instrument scales filed on April 9, 1946, and bearing Serial No. 660,592.

*Theory and operation*

To use the devices described and illustrated in the drawings; the instrument is exposed to pressure by Pitot static pressure connection 16 and connected through a source of electric power by contact plug 19 to the casing lights and electric bomb release switch 23. The bombardier now prepares to sight the target being approached and reaches for the connected instrument, while watching the target. The pivot of the collimator view plate 39 is then positioned adjacent his eyebrow, the illuminating means or bulb 72 being lighted with the thumb by switch button 73 and lamp bulb 29 by rheostat control switch 27, and knob 15 is rotated to set the pointer 31 for a known ground speed. Altitude is introduced automatically by altimeter aneroid or diaphragm 30 through the linkage to double pointer 31 from said ground speed setting, thus semi-automatically constantly correcting for dropping angles.

The collimator images of each colored sections 36a and 36b of ground speed scale piece 35 and colored pointer members 37a and 38a of altimeter pointer 31, one scale and its pointer being red and the other scale and its pointer being green, and the collimated image of bubble 70 are reflected by the view plate 39 in either the mirrored part 39a or unmirrored part 39b and said images are projected to the ground ahead of the aircraft, so that the scale and pointer indication images and bubble images appear to be travelling on the ground, the former to one side of the aircraft, angularly in a straight line ahead of the aircraft, with the pointers above the scales, near the target being approached, so that it is never necessary to lose sight of the target while adjusting the pointer 21 to the proper value of ground speed on the scales 36a and 36b. The image of the bubble is used or serves as an artificial horizon ahead of the aircraft and indicates the point of predicted impact, while the changes in altitude are semi-automatically corrected by manually maintaining the position of the pointers on the ground speed scales which indicates speeds in knots, by means of the altitude element and which affects the angular position of the pointers with respect to the cam 34 which moves the collimator viewing glass plate 39 accordingly, to follow the images constantly to the target for release of the bomb at the desired instant in the direction of or in line with the target viewed therethrough.

When the pilot sets the craft in a horizontal "collision" course to the sighted target and the image of bubble 70 apparently travelling along the ground toward the target crosses or aligns therewith, the bombardier instantly presses bomb release switch 23 with the right finger to release the bomb.

The theoretical basis leading to this new discovery, which provides for correcting bomb dropping angles for variations in two independent variables by the rotation of a single knob, is as illustrated below:

It may be shown that for an altitude zone of 400 to 2,000 feet and a ground speed range of 150 to 300 miles per hour the angular difference due to trail between the true dropping angle and the dropping angle for vacuum is small, less than one degree. A constant correction angle for near-average bombs may be chosen so that the maximum linear error calculated for average bombs will be less than fifty feet; this corresponds to angular errors of the order of one quarter of a degree. Likewise, if horizon mirror 87 is used in clear weather instead of bubble 70 the "natural horizon" then being the "base line," corrected by a chosen small constant angle, the errors are considerably less, because the variation of the "sea deep" correction (0.40 degree) approximately corrects for the variation of "trail angle" (as defined above) with altitude, in this altitude zone. The variation of "trail angle" with ground speed is very negligible in this case.

In consequence, by adjustment of the calibration angles of the collimator view plate 39 and of the horizon mirror 87, the "base lines" are adjusted at small angles to the horizontal to permit the use of the determined "dropping angles for vacuum" with an error considerably less than the expected human errors. The "base line" for use with the bubble is chosen as a constant angle of about a third of a degree below the horizontal; the "base line" for use when the "natural horizon" is visible is chosen as a constant angle of about a quarter of a degree above the "natural horizon."

The bombsight operates by mechanical determination of dropping angles for vacuum conditions, measuring these angles from the above described "base lines" pre-selected to correct for trail over the ranges of altitude and ground speed for which the instrument is designed.

The built-in altimeter and ground speed scale are, essentially, a logarithmic calculating device, similar to a circular slide rule, the output of which maintains the correct viewplate (or mirror) angle directly, through a suitable simple cam 34 calibrated to displace collimator view plate 39 according to the following formula.

For vacuum condition, angles measured from the horizontal, "optical axis" assumed vertical:

$$\text{"dropping angle"} = \text{arccotangent}\left(\sqrt{\frac{2}{g}}\frac{v_g}{\sqrt{p}}\right)$$

$$\text{"mirror angle"} = 45° + \tfrac{1}{2} \text{arccot}\left(\sqrt{\frac{2}{g}}\frac{v_g}{\sqrt{p}}\right)$$

where units are in the same system, $v_g$=ground speed, $p$=altitude, and $g$=acceleration due to gravity (assumed constant).

To change the equation for "mirror angle" to a function of sums (logarithmic form of equation):

$$\text{"mirror angle"} = 45° + \tfrac{1}{2} \text{arccot antilog}\ (K + \log v_g - \tfrac{1}{2} \log p)$$

where:

$$K = \log \sqrt{\frac{2}{g}} + \log R_u$$

The term $K$ is a calibration constant; that is, it enters the instrument at the time of assembly only (being essentially an angle between the altimeter pointer and the attached cam). $R_u$ is unity, if all units are in the same system; otherwise it is the constant ratio which relates the units, that is, the constant of proportionality for the equation, whatever the units may be.

The fixed ground speed scales 36a and 36b of scale piece 35 is logarithmically divided and the altimeter pointer 31 has a movement in relation to the altimeter case 32 and the cam 34 fixed to it, which is proportional to one half of the logarithm of the altitude to the same angular scale. The direction of the movement of altimeter pointer 31 for increasing altitude is the same as the direction of increase of ground speed on the fixed scale piece 35. Therefore, the operation of setting the pointer 31 opposite a number on the ground speed scale is a substraction of the respective angular logarithmic displacements and the angle or relative angular movements between the instrument altimeter pointer and the rotatable case 32 of the altimeter, is the logarithm of the ground speed divided by the square root of the altitude, as indicated in the formulas given above. The simple cam 34 which is attached to the altimeter case 32 displaces its rider arm or pin 56 a linear distance proportional to the arccotangent-antilogarithm function of the cam displacement angle. The linear movement of the cam rider arm 56 is converted, by use of a sector gear 54 of proper radius, to a view plate ("mirror") angle equal to one half of the "dropping angle from horizontal."

To calibrate the instrument in assembly operation, suitable near-center values of altitude and ground speed are chosen, and a radial line corresponding to the thereby-determined value of "dropping angle from horizontal" is scribed on the cam 34. Maintaining or holding the pressure at or on the altimeter through pitot-static pressure tube 16 at the pressure corresponding to the chosen altitude above the "zero setting" on the altimeter, and rotating the altimeter case 32 until the pointer 31 is indicating the chosen ground speed, the cam 34 is fastened to the altimeter case 32 in such a position that the cam rider arm 56 is touching the scribed radial line, described above. Next the viewplate angle is adjusted so that the bubble 70 appears at the proper angle to the horizontal for the chosen conditions; that is, the viewplate or mirror angle set should include the correction for variation of "base line" or artificial horizon produced or given by the projected collimated image of the bubble from the horizontal. The horizon-viewing mirror 87 is adjusted last to the "base line" chosen for its use. Under extreme conditions of glare, the bubble image may be brought to the completely reflecting part of the viewplate by a slight movement of the head, if necessary; the left eye alone would see the target in this case, but error in bomb release timing due to this practice would be negligible.

Although only two embodiments of the invention have been illustrated and described in detail, it is to be expressly understood that the invention is not limited thereto. Various changes may also be made in the design and arrangement of the parts without departing from the spirit and scope of the invention, as the same will now be understood by those skilled in the art. For a definition of the limits of the invention reference will be had to the appended claims.

What we claim is:

1. An impact predicting bombsight comprising, a collimating optical system including a variable source of illumination, a bubble level forming a part of said optical system, a tiltable viewing plate for reflecting the collimated image of said bubble level, the apparent bubble image as seen in the viewing plate indicating the point of bomb impact on the target, a ground speed scale and an indicator associated therewith viewable conjointly with the bubble level, a mechanism to tilt said viewing plate, said mechanism having a barometric pressure member to move the indicator in accordance with the altitude as represented by the barometric pressure and independent means for setting the indicator in accordance with the ground speed; the tilt applied to said viewing plate by said mechanism projecting the apparent bubble image at an angle with the horizontal to indicate the point of bomb impact.

2. An impact predicting bombsight comprising, a collimating optical system including a variable source of illumination, a bubble level forming a part of the optical system, a tiltable viewing plate for reflecting the collimated image of the bubble, the apparent bubble image as seen in the viewing plate indicating the point of bomb impact on the target, a ground speed scale and an indicator associated therewith viewable conjointly with the bubble level, a mechanism to tilt said viewing plate, said mechanism having a barometric pressure member to move the indicator in accordance with the logarithmic function of the altitude as represented by the barometric pressure and independent means for setting the indicator in accordance with the logarithmic function of the ground speed; the viewing plate being tilted to an angle measured from the horizontal equal to $45° + \frac{1}{2}$ arccot antilog $(K + \log V_g - \frac{1}{2} \log P)$ where $V_g$ is ground speed, $P$ is altitude, and wherein $$K = \log \sqrt{\frac{2}{g}} + \log R_u$$

the calibration constant for the instrument, where $g$ is acceleration due to gravity, and $R_u$ is the proportionality constant of the units in the equation.

3. An impact predicting bombsight comprising, a collimating optical system including a variable source of illumination, a bubble level forming a part of the optical system, a tiltable viewing plate for reflecting the collimated image of the bubble, the apparent bubble image as seen in the viewing plate indicating the point of bomb impact on the target, a ground speed scale and an indicator associated therewith viewable conjointly with the bubble level, a mechanism to tilt said viewing plate, said mechanism having a barometric pressure member to move the indicator in accordance with the logarithmic function of the altitude as represented by the barometric pressure, said barometric pressure member being provided with a correcting means for axially displacing said member to correct for target altitude, independent means for setting the indicator in accordance with the logarithmic function of the ground speed; the viewing plate being tilted to an angle measured from the horizontal equal to $45° + \frac{1}{2}$ arccot antilog $(K + \log V_g - \frac{1}{2} \log P)$ where $V_g$ is ground speed, $P$ is altitude, and wherein $$K = \log \sqrt{\frac{2}{g}} + \log R_u$$

the calibration constant for the instrument, where $g$ is acceleration due to gravity, and $R_u$ is the proportionality constant of the units in the equation.

4. In a bombsight, an angularly adjustable transparent mirror, a barometric pressure sensitive element, rotatable supporting means for the element operatively connected to the mirror, a pointer operatively connected to the element and movable relative to the supporting means, means to set the element at zero altitude, a fixed double logarithmically divided transparent scale below said pointer, said pointer having bi-refringent colored transparent heads movable over the scale, illuminating means below the scale and pointer, polarizing strips above and below the pointer heads, the polarizing planes of said strips being at right angles to each other, the axis of said bi-refringent heads being such as to permit light to be transmitted through said heads and said strips, the bubble chamber having a bubble, a lighting means adjacent the bubble chamber, a light stop adjacent the lighting means and bubble chamber, a prism arranged to reflect an image of the bubble to the mirror, a lens between the prism and mirror, and means to manually adjust the pointer on the scale and simultaneously adjust the mirror angle.

5. In a hand held low altitude bomb sight, the combination with a casing having a hand grip provided with a bomb release mechanism, a bubble instrument adapted to project a collimated image of a bubble, an altitude sensitive element, a rotatable altimeter casing in which said element is mounted, a curved logarithmically-divided ground speed scale fixed adjacent the periphery of the casing and having transparent portions with parallel scales, a double pointer having angularly related arms and operatively connected to the element and rotatable with the casing over the scales, the scales being angularly spaced by an amount equal to the angle between the two angularly fixed arms of the double pointer whereby upon rotation of the casing, the pointer will move proportionately to the logarithm of the tangent of the dropping angle of the bomb, an angularly movable transparent glass view plate through which said bubble and the target are visible, operative connections between the casing and the view plate to adjust the view plate in which may be seen projected upon the ground a collimated image of the bubble downwardly ahead of the aircraft and also to reflect collimated images of the pointer and logarithmically-divided scale at one side of the bubble image, and means for adjusting the element to zero altitude and the pointer proportionately on the scale, including linkage means between the element and the pointer to transmit the lineal movement of the element to the indicator pointer angularly over the scale proportionately to the logarithmic sine curve from which the scale is plotted.

6. A bombsight comprising a movable casing, an altitude sensitive element mounted in the casing to move therewith and independently thereof, a pointer pivoted at the axis of the casing and operatively connected to the element, an indicator for the element, means to set the indicator at zero and actuate the element and pointer independently of the casing, said pointer having two angularly related arms with open frames, a fixed bi-refringent material within said frames, a fixed concaved scale piece adjacent the pointer, said scale piece having two parallel rows of calibrations angularly spaced by an amount equal to the angle between the arms of the pointer and being transparent, illuminating means for said scale piece and the material in said frames, light polarizing strips adjacent to both sides of said frames, the polarization planes of said strips being at right angles to each other, the axis of the bi-refringent material of the frame being so disposed as to rotate the polarized plane of the light to permit light transmittal through said material and said strips, means to turn the casing, an illuminated bubble, an angularly movable transparent view plate member, a cam rotatable with the casing and operatively connected to the view plate member to adjust the angle thereof, and reflecting means between the view plate member, pointer frames, scale piece and bubble arranged to project collimated images of the bubble onto the ground ahead of the aircraft to which the device is applied, to indicate the point at which the bombs would strike if released.

7. In a hand-held low altitude bombsight, the combination with a casing having a hand grip, a bomb release trigger mechanism on the hand grip, a bubble instrument adapted to project an image of a bubble, an altitude sensitive element, a rotatable altimeter casing in which said element is mounted, a fixed logarithmically-divided transparent ground speed scale adjacent said casing, a pointer carried by the casing operatively connected to the element and movable with and relative to the casing over said scale, said casing upon rotation being adapted to cause the pointer to establish a position on the scale proportionate to the logarithm of the tangent of the dropping angle of the bomb, a movable clear glass view plate, a cam rotatable with the casing and operatively connected to the view plate to cooperatively adjust said view plate in which may be seen the images of the bubble, the pointer and the scale projected downwardly to the ground ahead of an aircraft in the line of impact toward the target on a collision course, and linkage means between the element and pointer to convert and transmit the approximately lineal movement of the element to the pointer in an angular sweep substantially proportionate to a logarithmic sine curve from which the scale is plotted.

8. A bombsight comprising an angularly adjustable clear glass view plate, a sector secured to the view plate, a driver, a movable casing, a cam fixed to the casing and engaged by the driver, said driver being operatively connected to the sector to adjust the angle of the view plate, an altitude sensitive element within the rotatable casing, means to set said element, a pointer having a linkage connection with the element and movable with the casing, said pointer having arms angularly spaced and adapted to be displaced in proportion to the logarithm of the altitude, a logarithmically-divided ground speed scale adjacent the pointer and having two parallel graduations angularly spaced by an amount equal to the angle between the arms of the pointer, manual means to rotate said casing and cam together to synchronously set the angle of the view plate with the setting of the casing and pointer, said view plate and pointer being set in accordance with altitude, said pointer arms being provided with light transmitting heads of bi-refringent material, illuminating means for said scale and said heads, light polarizing strips adjacent to both sides of said heads, the polarizing plane of said strips being at right angles to each other, the axis of the bi-refringent material of said heads being so disposed as to rotate the polarized plane of the light to permit light transmission through said head and said strips, control means for said illuminating means, an aircraft bubble instrument having a bubble, a prism adjacent said scale and bubble instrument, illuminating means associated with said bubble instrument, said bubble being in the focal path of the latter illuminating means, and a magnifying lens below said view plate in a line of focus with said scale and said prism arranged to reflect collimated images of said pointer, scale portions and bubble to said view plate in which they may be seen as if projected onto the ground ahead of the aircraft near the target.

9. A bombsight comprising an angularly adjustable transparent mirror, a sector gear secured to the view plate to move therewith, a rotatable casing, a cam fixed to the casing, a driver resting on the cam and having operative connection with the sector whereby rotation of the cam will cause lineal motion of the driver to adjust the angle of the mirror, an altitude sensitive element in and rotatable with the casing and having an indicator, a pointer at one end of the casing and having diverging arms with transparent heads normal thereto, means to set the element and indicator for altitude, an operative connection between the element and the pointer to move the latter independently of the casing, said pointer being also adapted to rotate with the casing, a logarithmically-divided ground speed scale fixed adjacent the heads of the pointer and having an offset light polarizing transparent portion and two rows of graduations angularly spaced by an amount equal to the angle between the arms of the pointer, the heads being adapted to each cooperate with a row of graduations over the offset portion and the graduated portions being transparent, illuminating means for said transparent portions and the heads of the pointer, a chamber having a bubble therein, a prism adjacent said scale and bubble chamber, illuminating means for said bubble chamber, and a magnifying lens below said mirror in a line of focus with said scale and prism to cause the latter to reflect light through the bubble and reflect collimated images of said pointer heads, graduations and bubble to said mirror and project said images on the ground in the line of flight toward the target.

GREGORY V. RYLSKY.
FREDERICK W. SCHULE, Jr.